(12) United States Patent
Suzuki

(10) Patent No.: US 12,399,613 B2
(45) Date of Patent: Aug. 26, 2025

(54) DISPLAY DEVICE AND DISPLAY METHOD

(71) Applicant: SEIKO EPSON CORPORATION, Tokyo (JP)

(72) Inventor: Atsushi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 438 days.

(21) Appl. No.: 17/897,385

(22) Filed: Aug. 29, 2022

(65) Prior Publication Data

US 2023/0066745 A1    Mar. 2, 2023

(30) Foreign Application Priority Data

Aug. 27, 2021 (JP) ................................ 2021-138494

(51) Int. Cl.
  *G06F 3/04886* (2022.01)
  *G06F 3/0481* (2022.01)
  *G06V 30/262* (2022.01)

(52) U.S. Cl.
  CPC ........ *G06F 3/04886* (2013.01); *G06F 3/0481* (2013.01); *G06V 30/262* (2022.01)

(58) Field of Classification Search
  CPC .... G06F 3/04886; G06F 3/0481; G06F 21/84; G06F 21/45; G06F 3/016; G06V 30/262; H04L 63/083
  See application file for complete search history.

(56) References Cited

U.S. PATENT DOCUMENTS

| | | | |
|---|---|---|---|
| 10,440,007 B1* | 10/2019 | Ramalingam | G06F 21/84 |
| 2006/0217985 A1 | 9/2006 | Noguchi et al. | |
| 2010/0005525 A1* | 1/2010 | Fischer | G06F 21/31 |
| | | | 726/21 |

(Continued)

FOREIGN PATENT DOCUMENTS

| | | | |
|---|---|---|---|
| JP | 2001166843 A | 6/2001 | |
| JP | 2006268319 A | 10/2006 | |

(Continued)

OTHER PUBLICATIONS

Office Action for JP Patent Application No. 2021138494, issued on Apr. 1, 2025, 6 pages.

*Primary Examiner* — Iriana Cruz
(74) *Attorney, Agent, or Firm* — CHIP LAW GROUP

(57) ABSTRACT

A display device includes: a display unit including a touch panel; and a control unit configured to display, on the display unit, a character input area in which a soft key is arranged, repeatedly receive, from the character input area, an operation for inputting an input character, and display, on the display unit, an input character string display area in which a character string that is a sequence of the input character is displayed. The control unit is configured to arrange in order, in the input character string display area, one of the input character and a replacement character for replacing the input character, acquire from a database including input character confirmation information for confirming a character, when receiving the operation for inputting the input character from the character input area, the input character confirmation information corresponding to the input character, and display the acquired input character confirmation information on the display unit.

12 Claims, 12 Drawing Sheets

(56) References Cited

U.S. PATENT DOCUMENTS

| | | | | |
|---|---|---|---|---|
| 2016/0012617 A1* | 1/2016 | Maetz | ................. | G06F 21/31 |
| | | | | 345/593 |
| 2017/0223201 A1* | 8/2017 | Ueno | ................. | G06F 3/0233 |
| 2019/0250815 A1* | 8/2019 | Tashiro | ............... | G06F 3/0237 |
| 2022/0017042 A1* | 1/2022 | Zhang | ................. | B60R 25/23 |

FOREIGN PATENT DOCUMENTS

| | | |
|---|---|---|
| JP | 2014142681 A | 8/2014 |
| JP | 2019045946 A | 3/2019 |

* cited by examiner

FIG. 3

DATABASE DB1

INPUT CHARACTER CONFIRMATION INFORMATION IN1

| CHARACTER | EMPHASIS ON PHONETIC CODE | EMPHASIS ON EASY-TO-UNDERSTAND WORD | EMPHASIS ON PRONUNCIATION |
|---|---|---|---|
| 1 | One | One | One |
| 2 | Two | Two | Two |
| 3 | Three | Three | Three |
| 4 | Four | Four | Four |
| ... | ... | ... | ... |
| A | ALPHA | APPLE | ei |
| B | BRAVO | BANANA | bi: |
| C | CHARLIE | CAKE | si: |
| D | DELTA | DESSERT | di: |
| ... | ... | ... | ... |
| a | alpha | apple | ei |
| b | bravo | banana | bi: |
| c | charlie | cake | si: |
| d | delta | dessert | di: |
| ... | ... | ... | ... |
| - | Minus Sign | Minus | Hyphen |
| _ | Underscore | Underline | Underline |
| , | Comma | Comma | Comma |
| . | Period | Dot | Dot |

90     IN2, IN2a     IN2, IN2b     IN2, IN2c

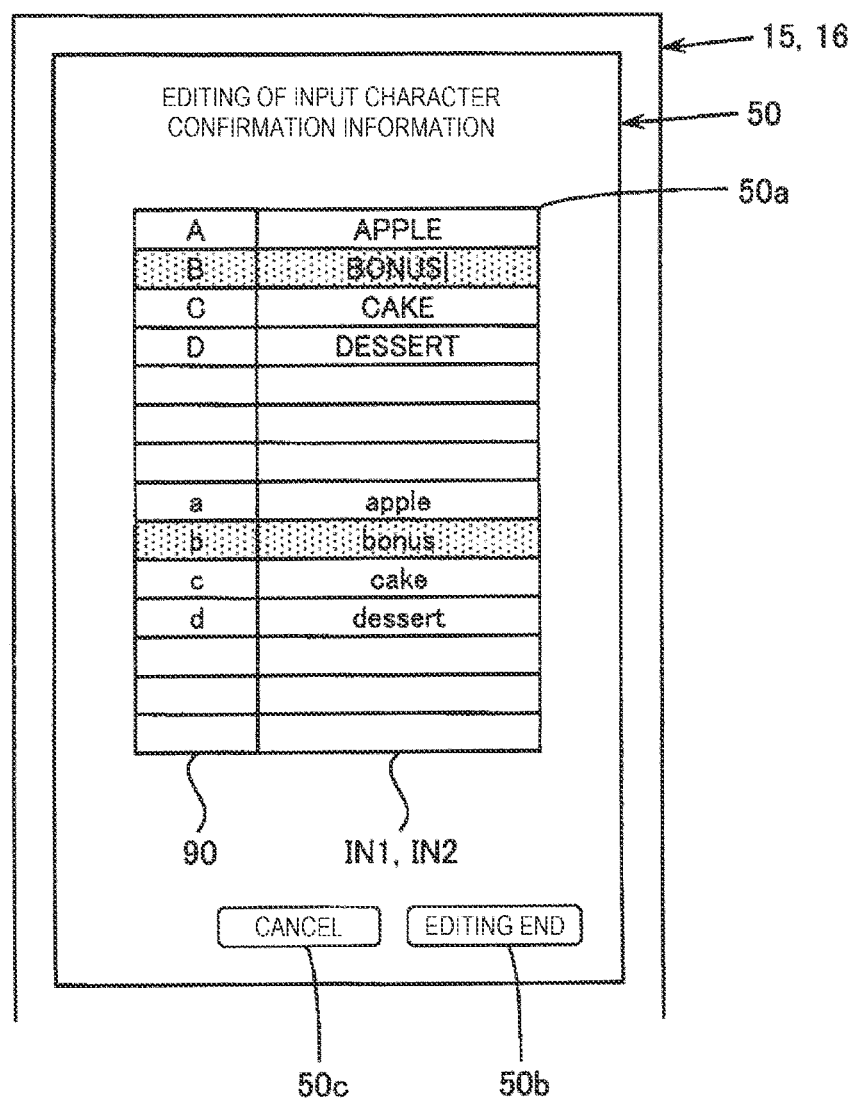

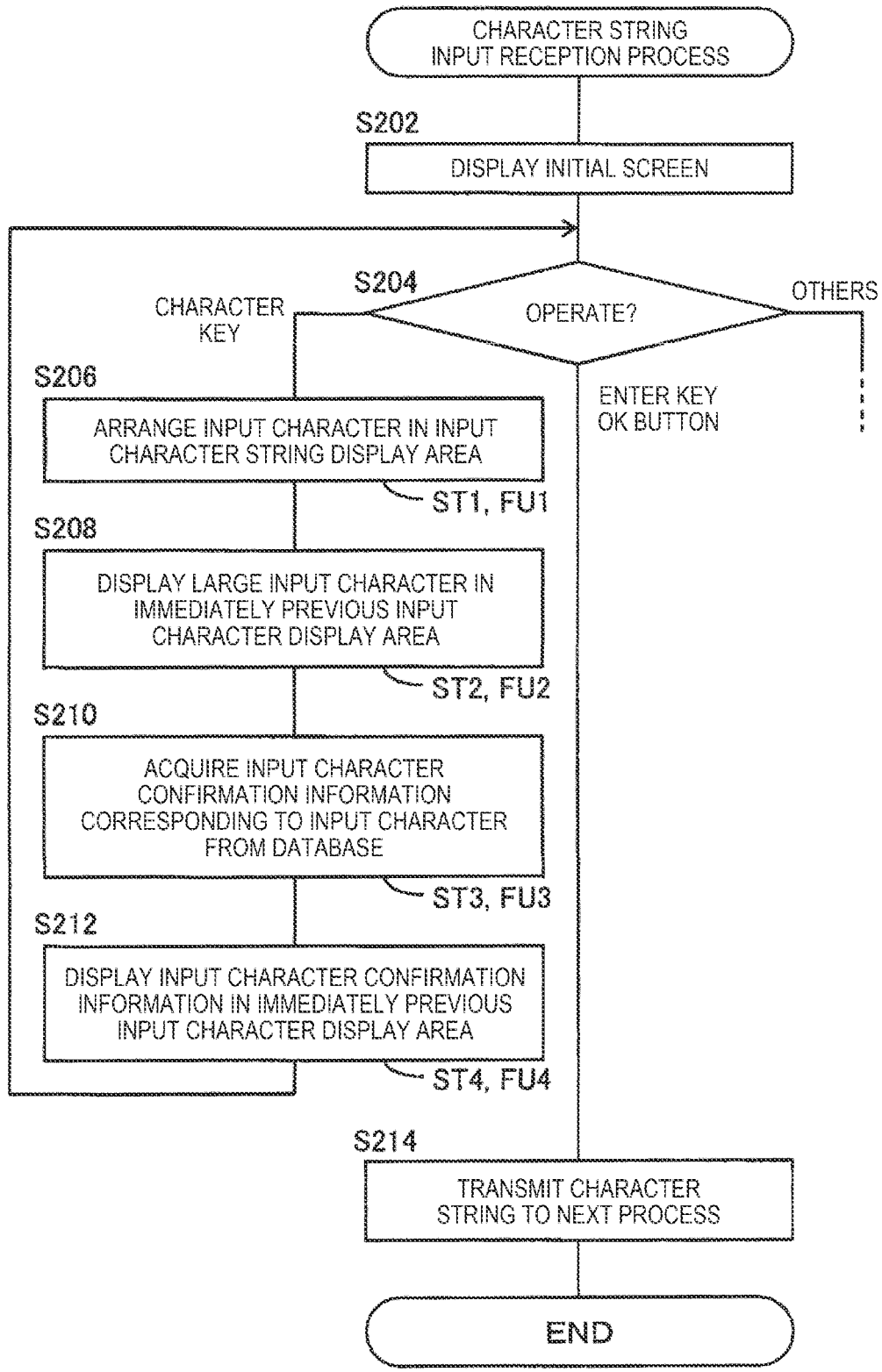

DISPLAY DEVICE AND DISPLAY METHOD

The present application is based on, and claims priority from JP Application Serial Number 2021-138494, filed Aug. 27, 2021, the disclosure of which is hereby incorporated by reference herein in its entirety.

BACKGROUND

1. Technical Field

The present disclosure relates to a display device, a display method, and a display program for receiving input of a character string.

2. Related Art

When receiving input of a character string such as a password or an SSID, a smart device such as a smartphone or a tablet terminal displays a software keyboard and repeatedly receives an operation for inputting an input character from the software keyboard. Here, the SSID is an abbreviation of service set identifier. The input character is displayed as it is or replaced with a predetermined character such as "*" and arranged in order.

A mobile terminal disclosed in JP-A-2001-166843 temporarily displays a character selected by an operator, and hides the character by displaying an asterisk "*" when a confirmation key is pressed.

It is required in a smart device that a character is input in a small area for display and input, and it is difficult to execute blind touch as in a physical keyboard. Therefore, the user may pay close attention to a software keyboard and may not notice erroneous input.

The problem also exists in a display device other than the smart device.

SUMMARY

A display device according to an aspect of the present disclosure includes: a display unit including a touch panel; and a control unit configured to display, on the display unit, a character input area in which a soft key is arranged, repeatedly receive, from the character input area, an operation for inputting an input character, and display, on the display unit, an input character string display area in which a character string that is a sequence of the input character is displayed. The control unit is configured to arrange in order, in the input character string display area, one of the input character and a replacement character for replacing the input character, acquire from a database including input character confirmation information for confirming a character, when receiving the operation for inputting the input character from the character input area, the input character confirmation information corresponding to the input character, and display the acquired input character confirmation information on the display unit.

A display method according to an aspect of the present disclosure is a display method for displaying, on a display unit including a touch panel, a character input area in which a soft key is arranged; repeatedly receiving, from the character input area, an operation for inputting an input character; displaying, on the display unit, an input character string display area in which a character string that is a sequence of the input character is displayed; and arranging in order, in the input character string display area, one of the input character and a replacement character for replacing the input character. The display method includes: an input character confirmation information acquisition step of acquiring from a database including input character confirmation information for confirming a character, when the operation for inputting the input character is received from the character input area, the input character confirmation information corresponding to the input character; and an input character confirmation information display step of displaying the acquired input character confirmation information on the display unit.

A non-transitory computer-readable storage medium according to an aspect of the present disclosure stores a display program which is a display program for displaying, on a display unit including a touch panel, a character input area in which a soft key is arranged, repeatedly receiving, from the character input area, an operation for inputting an input character, displaying, on the display unit, an input character string display area in which a character string that is a sequence of the input character is displayed, and arranging in order, in the input character string display area, one of the input character and a replacement character for replacing the input character. The display program causes a computer to implement: an input character confirmation information acquisition function of acquiring from a database including input character confirmation information for confirming a character, when the operation for inputting the input character is received from the character input area, the input character confirmation information corresponding to the input character; and an input character confirmation information display function of displaying the acquired input character confirmation information on the display unit.

BRIEF DESCRIPTION OF THE DRAWINGS

FIG. 3 is a diagram schematically showing a configuration example of input character confirmation information included in a database.

FIG. 7 is a diagram schematically showing an example of an editing area displayed on the display unit.

FIG. 8 is a flowchart showing an example of character string input reception process.

DESCRIPTION OF EXEMPLARY EMBODIMENTS

Figure 1:
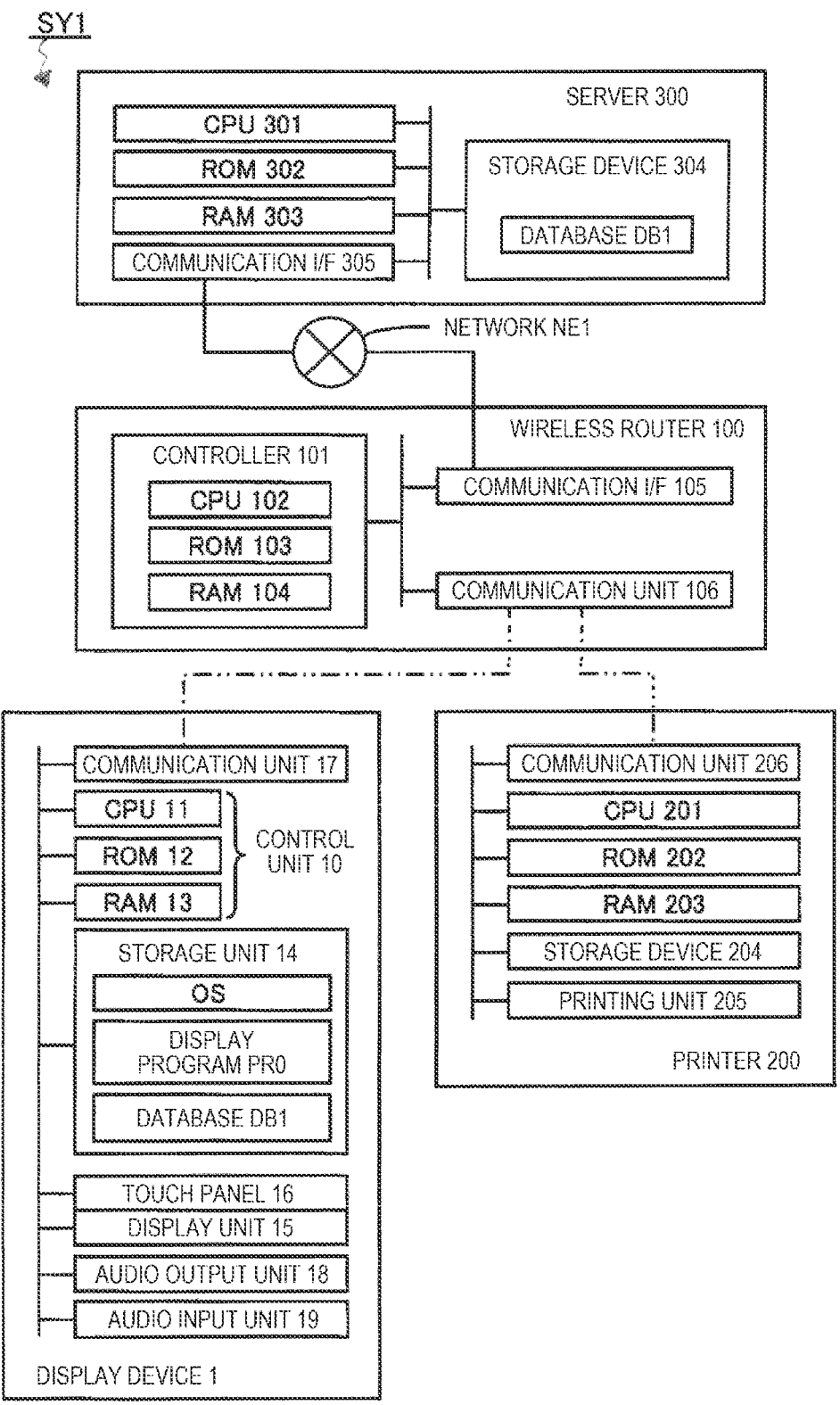
FIG. 1 is a block diagram schematically showing a configuration example of a system including a display device.

Hereinafter, embodiments of the present disclosure will be described. Of course, the following embodiments are merely examples of the present disclosure, and all of features shown in the embodiments are not necessarily essential to the solution to problems of the present disclosure.

1. Outline of Technique Included in Present Disclosure

First, an outline of a technique included in the present disclosure will be described with reference to examples shown in FIGS. 1 to 12. The drawings of the present application are diagrams schematically showing examples, and enlargement ratios in respective directions shown in these drawings may be different from each other, and the respective drawings may not be consistent with each other. Of course, each element of the present technique is not limited to the specific examples indicated by reference numerals. In the "Outline of Technique Included in Present Disclosure", words in parentheses mean a supplementary explanation of an immediately previous word.

Aspect 1

Figure 2:
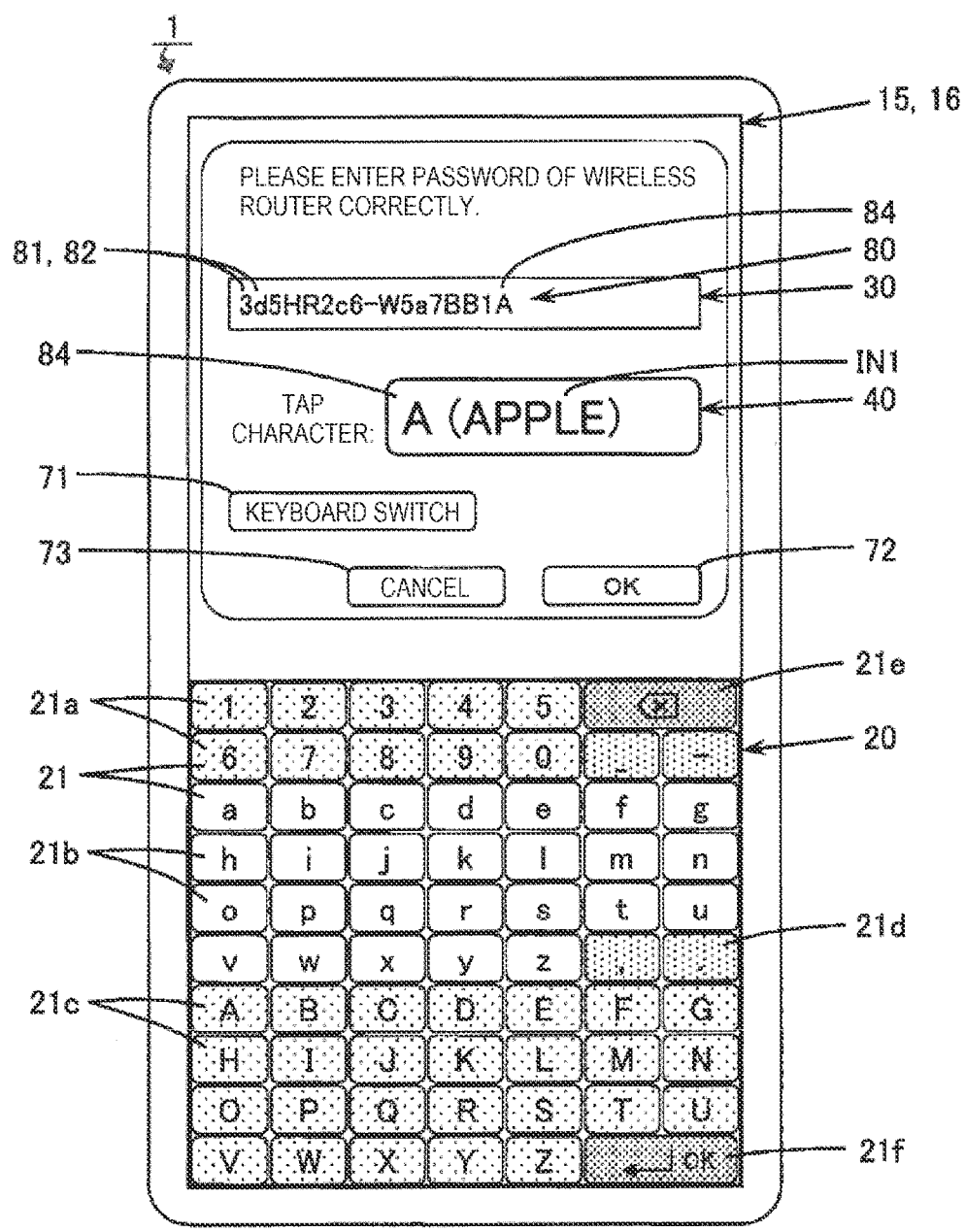
FIG. 2 is a diagram schematically showing an example of a password input screen displayed on the display device.
Figure 9A:
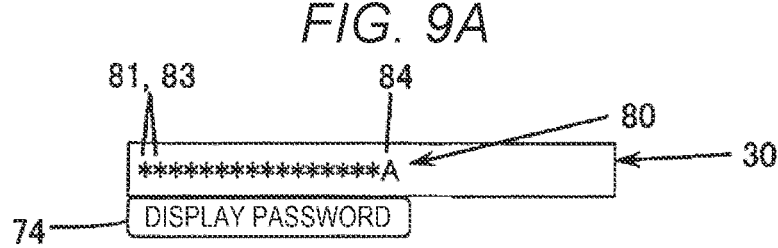
FIG. 9A is a diagram schematically showing another example of an input character string display area.

As shown in FIG. 1 and the like, a display device 1 according to an aspect of the present technique includes a display unit 15 and a control unit 10. The display unit 15 includes a touch panel 16. As shown in FIG. 2 and the like, the control unit 10 displays, on the display unit 15, a character input area 20 in which soft keys 21 are arranged, repeatedly receives, from the character input area 20, an operation for inputting an input character 82, and displays, on the display unit 15, an input character string display area 30 in which a character string 80 that is a sequence of the input characters 82 is displayed. As shown in FIGS. 2, 8, 9A, and the like, the control unit 10 arranges in order, in the input character string display area 30, one of the input character 82 and a replacement character 83 for replacing the input character 82. As shown in FIGS. 3 and 8, when receiving, from the character input area 20, the operation for inputting the input character 82, the control unit 10 acquires input character confirmation information IN1 corresponding to the input character 82 from a database DB1 including input character confirmation information IN1 for confirming characters 90. As shown in FIGS. 2, 8, and the like, the control unit 10 displays the acquired input character confirmation information IN1 on the display unit 15.

When a user performs an operation on the character input area 20, one of the input character 82 and the replacement character 83 for replacing the input character 82 is arranged in order in the input character string display area 30. The input character confirmation information IN1 corresponding to the input character 82 is displayed on the display unit 15. The user can confirm whether the input character 82 is correct by viewing the input character confirmation information IN1 corresponding to the input character 82. As described above, in Aspect 1, since what an immediately previous input character is can be easily confirmed, erroneous input can be reduced. For example, when the character string is important registration information, it is easy to accurately input the important registration information, and failure of setting can be reduced.

Here, a key layout in the character input area 20 is not limited to a standardized keyboard layout, and may be a non-standardized layout such as in alphabetical order or the like.

The database DB1 may be stored in the display device itself or may be stored in an external computer such as a server 300.

The additional statements are also applied to the following aspects.

Aspect 2

Figure 9B:
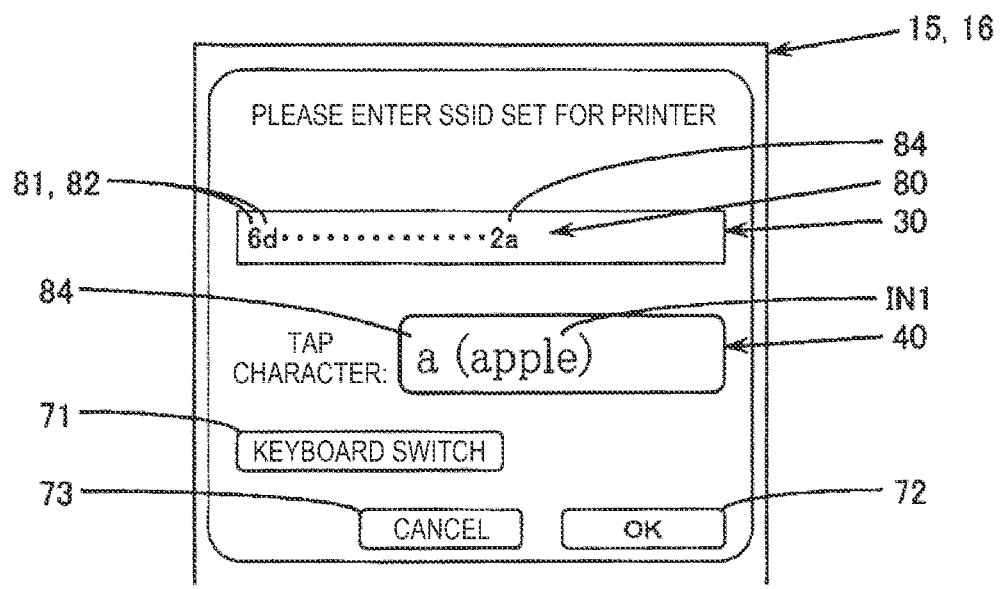
FIG. 9B is a diagram schematically showing an example of an SSID input screen displayed on the display unit.

As shown in FIGS. 2 and 9B, the character string 80 may be one of a password and an identifier. As shown in FIG. 3 and the like, the input character confirmation information IN1 may include at least one of a phonetic code of the character 90, a word having the character 90 as an initial character, and a pronunciation of the character 90. In the present aspect, it is possible to easily input the password or the identifier that is the important registration information.

Here, the identifier includes an SSID, an IP address, a domain name, a host name, a port number, a MAC address, a mail address, and the like. The IP address is an abbreviation of internet protocol address, and the MAC address is an abbreviation of media access control address.

The phonetic code is also referred to as a spelling alphabet, and is a word used in an international unified manner.

The additional statements are also applied to the following aspects.

Aspect 3

As shown in FIG. 2 and the like, the control unit 10 may display, on the display unit 15, an immediately previous input character display area 40, in which an immediately previous input character 84 input in response to immediately previous reception of the operation is displayed, separately from the input character string display area 30. In the aspect, since the immediately previous input character 84 input in response to the immediately previous reception of the operation is displayed in the immediately previous input character display area 40 separately from the character string 80 displayed in the input character string display area 30, the immediately previous input character can be more easily confirmed.

Figure 12:
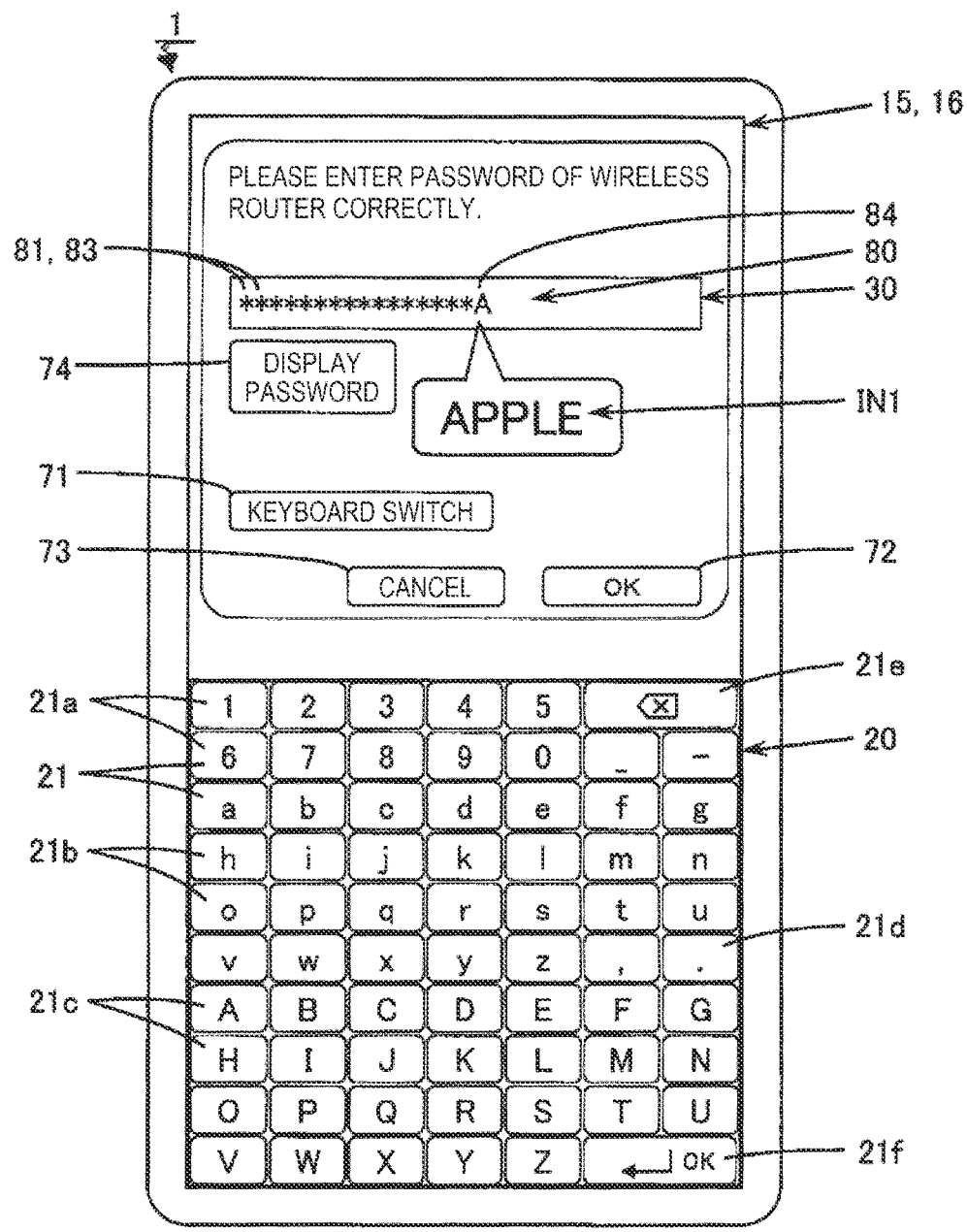
FIG. 12 is a diagram schematically showing another example of the password input screen displayed on the display device.

Although not included in Aspect 3, an example in which the immediately previous input character display area 40 is not displayed on the display unit 15 as shown in FIG. 12 is also included in the present technique.

Aspect 4

As shown in FIG. 2 and the like, the control unit 10 may display the input character 82 in the immediately previous input character display area 40 in a manner of being larger than a display character 81 in the input character string display area 30. In this aspect, since the immediately previous input character 84 input in response to the immediately previous reception of the operation is displayed in a large size, the immediately previous input character can be more easily confirmed.

Aspect 5

As shown in FIG. 2 and the like, the control unit 10 may display the input character confirmation information IN1 in parentheses in the immediately previous input character display area 40. In the aspect, since the input character confirmation information IN1 is displayed in the parentheses according to the immediately previous input character 84 input in response to the immediately previous reception of the operation, the immediately previous input character can be more easily confirmed.

Aspect 6

Figure 10:
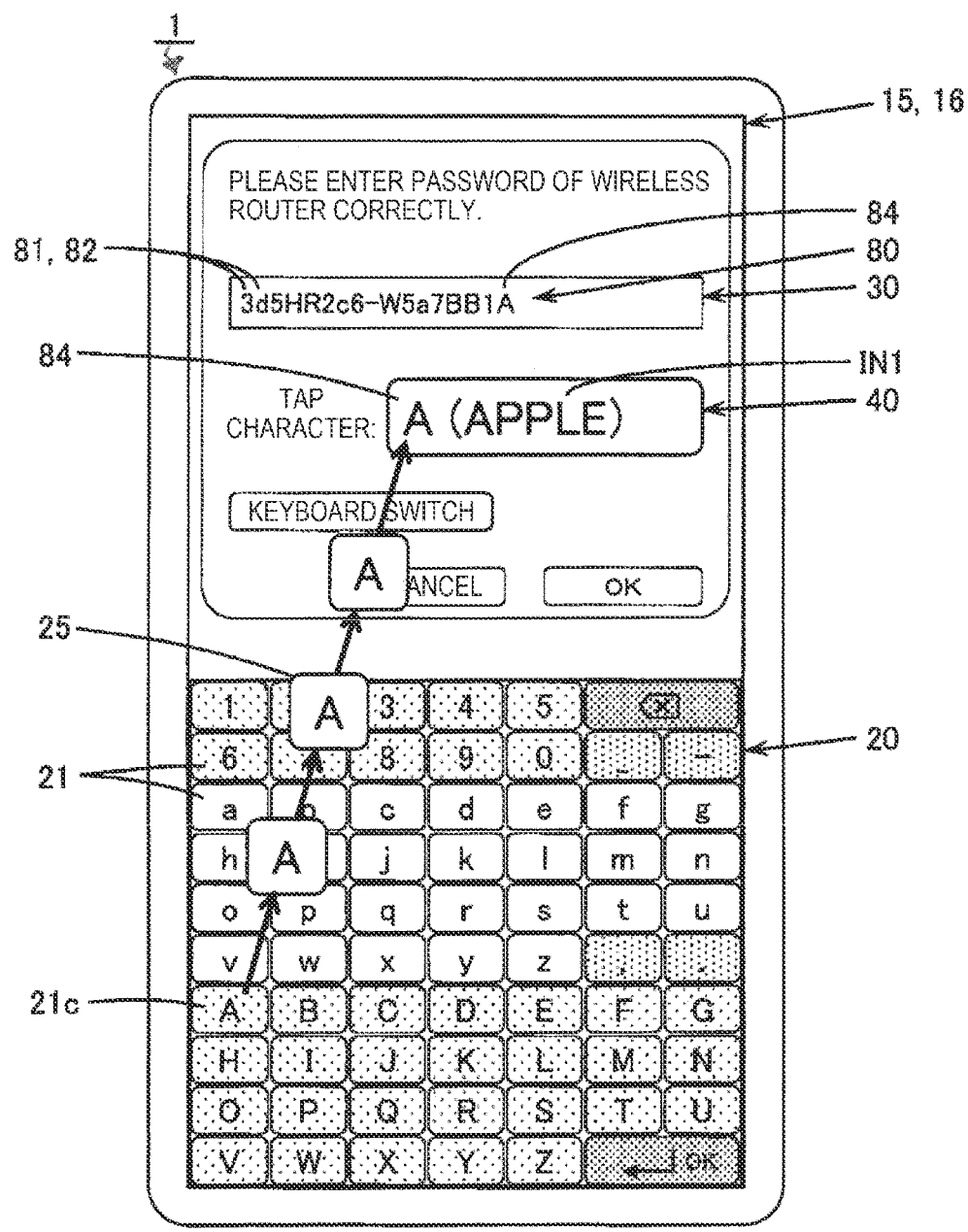
FIG. 10 is a diagram schematically showing an example of an animation display of an input character.

As shown in FIG. 10, the control unit 10 may display, on the display unit 15, the input character 82 input in response to reception of the operation, such that the input character 82 floats from the character input area 20 and moves to the immediately previous input character display area 40. In the aspect, an animation display 25 is executed in which the input character 82 floats from the character input area 20 and moves to the immediately previous input character display area 40, and thus the immediately previous input character can be more easily confirmed.

Aspect 7

Figure 9C:
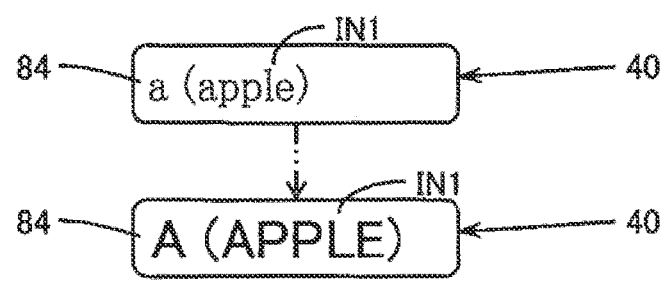
FIG. 9C is a diagram schematically showing a display example of an immediately previous input character display area.

As shown in FIGS. 2, 9B, and 9C, the control unit 10 may display the input character confirmation information IN1 on the display unit 15 such that at least one of a typeface and a character size is changed depending on whether the input character 82 is an uppercase character of the alphabet or is a lowercase character of the alphabet. In the aspect, since the input character confirmation information IN1 is displayed such that at least one of the typeface and the character size when the input character 82 is the uppercase character of the alphabet is different from that when the input character 82 is the lowercase character of the alphabet, the immediately previous input character can be more easily confirmed.

Aspect 8

As shown in FIG. 7, the control unit 10 may display, on the display unit 15, an editing area 50 for receiving editing of the input character confirmation information IN1 to be displayed on the display unit 15. When receiving the editing of the input character confirmation information IN1 from the editing area 50, the control unit 10 may display, on the display unit 15, the input character confirmation information IN1 that corresponds to the input character 82 and is obtained in response to reception of the editing. In the present aspect, since the display of the input character confirmation information IN1 can be customized, the immediately previous input character can be more easily confirmed.

Aspect 9

Figure 5:
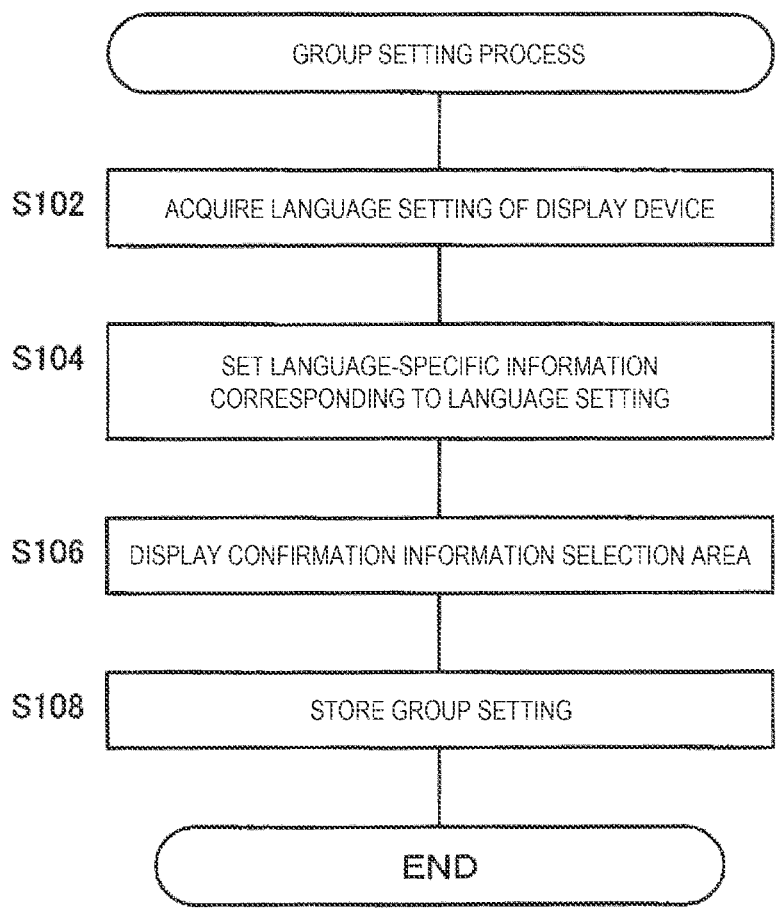
FIG. 5 is a flowchart showing an example of a group setting process.
Figure 6:
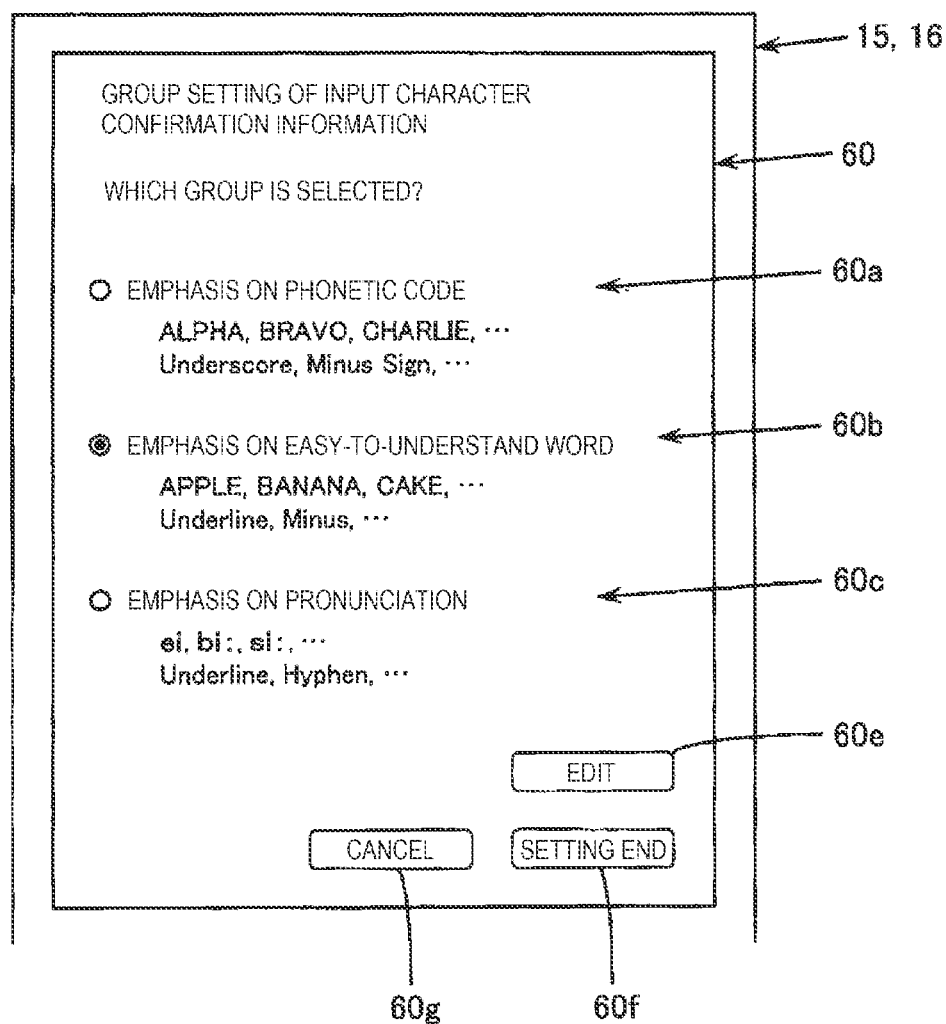
FIG. 6 is a diagram schematically showing an example of a confirmation information selection area displayed on a display unit.

As shown in FIG. 3 and the like, the input character confirmation information IN1 may be divided into a plurality of groups of confirmation information IN2. As shown in FIGS. 5 and 6, the control unit 10 may display, on the display unit 15, a confirmation information selection area 60 for receiving selection of the confirmation information IN2 to be displayed on the display unit 15 from the plurality of groups of confirmation information IN2. When receiving the selection of the confirmation information IN2 from the confirmation information selection area 60, the control unit 10 may acquire, from the database DB1, the confirmation information IN2 selected among the input character confirmation information IN1 corresponding to the input character 82. The control unit 10 may display the acquired confirmation information IN2 on the display unit 15. In the present aspect, since the input character confirmation information IN1 to be displayed can be selected from the plurality of divided groups of confirmation information IN2, the immediately previous input character can be more easily confirmed.

Aspect 10

Figure 4:
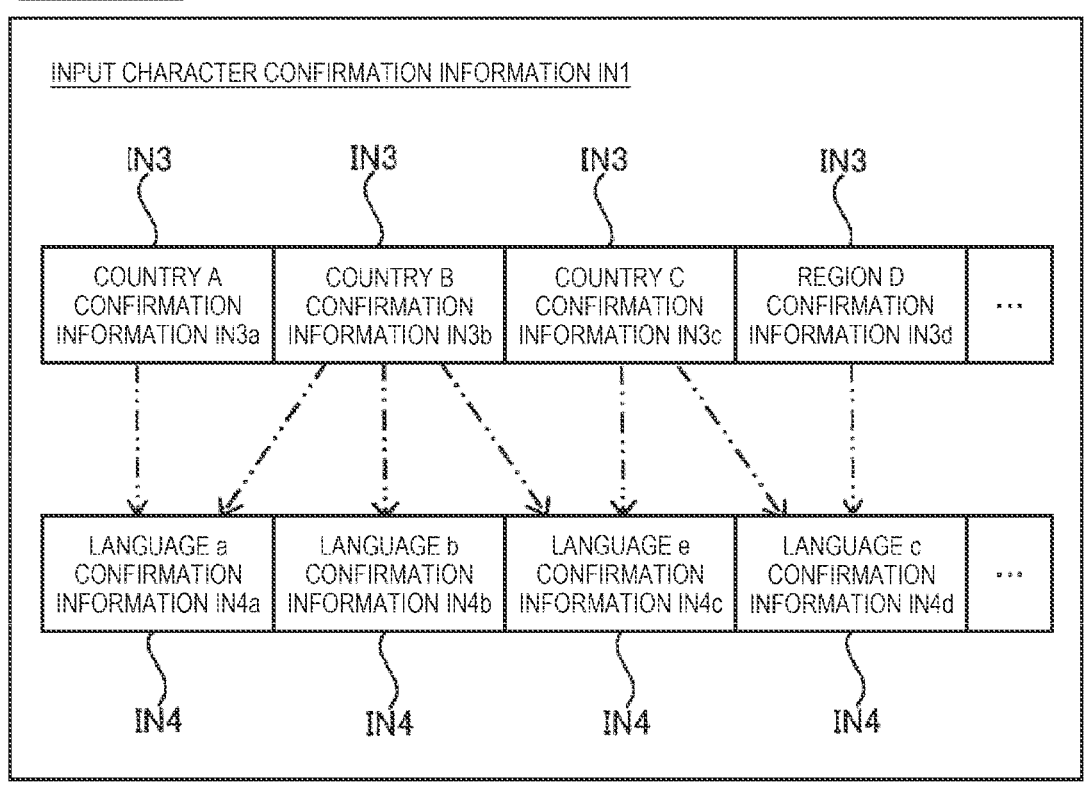
FIG. 4 is a diagram schematically showing a configuration example of the database including the input character confirmation information.
Figure 11:
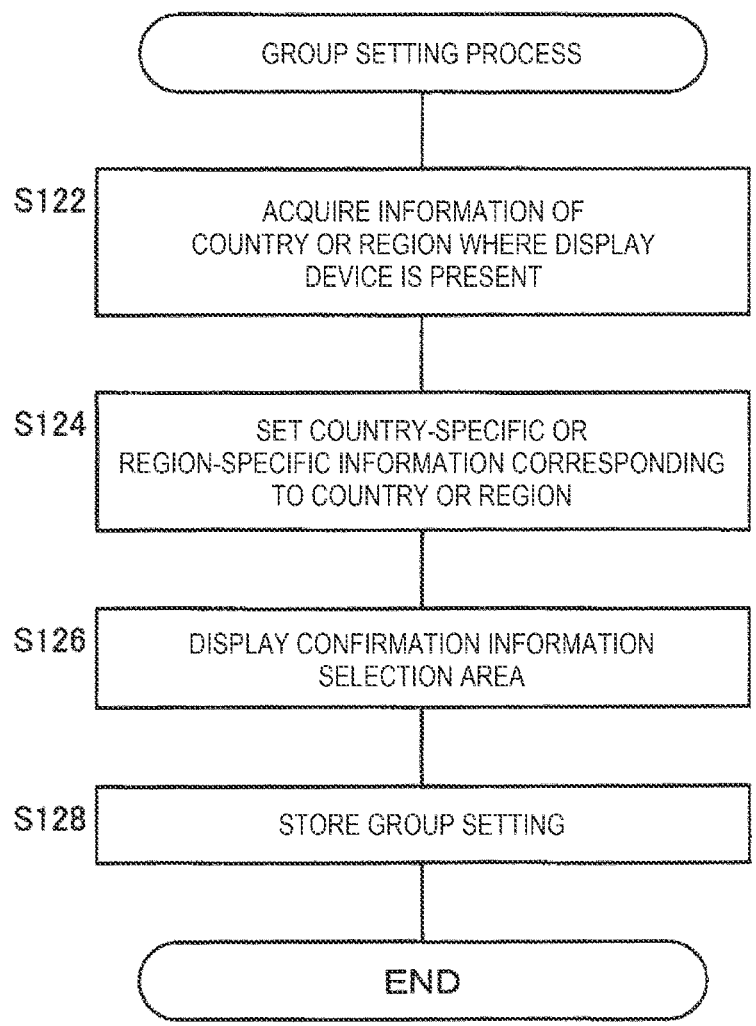
FIG. 11 is a flowchart showing another example of the group setting process.

As shown in FIG. 4, the input character confirmation information IN1 may be divided into a plurality of groups of country-specific or region-specific information IN3 according to countries or regions. As shown in FIGS. 11 and 8, the control unit 10 may acquire, from the database DB1, the country-specific or region-specific information IN3 corresponding to a country or a region where the display device 1 is present among the input character confirmation information IN1 corresponding to the input character 82. The control unit 10 may display the acquired country-specific or region-specific information IN3 on the display unit 15. In the present aspect, since the country-specific or region-specific information IN3 corresponding to the country or the region where the display device 1 is present among the input character confirmation information IN1 is displayed, the immediately previous input character can be more easily confirmed.

Aspect 11

As shown in FIG. 4, the input character confirmation information IN1 may be divided into a plurality of groups of language-specific information IN4 according to languages. As shown in FIG. 5, the control unit 10 may acquire, from the database DB1, the language-specific information IN4 corresponding to a language set in the display device 1 among the input character confirmation information IN1 corresponding to the input character 82. The control unit 10 may display the acquired language-specific information IN4 on the display unit 15. In the present aspect, since the language-specific information IN4 corresponding to the language set in the display device 1 among the input character confirmation information IN1 is displayed, the immediately previous input character can be more easily confirmed.

Aspect 12

As shown in FIGS. 1 and 8, a display method according to an aspect of the present technique is a display method for displaying, on the display unit 15 including the touch panel 16, the character input area 20 in which the soft keys 21 are arranged; repeatedly receiving an operation for inputting the input character 82 from the character input area 20; displaying, on the display unit 15, the input character string display area 30 in which the character string 80 that is the sequence of the input character 82 is displayed; and arranging in order, in the input character string display area 30, one of the input character 82 and the replacement character 83 for replacing the input character 82. The display method includes steps (A) and (B).

Step (A) is an input character confirmation information acquisition step ST3 of acquiring, from the database DB1 including the input character confirmation information IN1 for confirming the character 90, the input character confirmation information IN1 corresponding to the input character 82 when the operation for inputting the input character 82 is received from the character input area 20.

Step (B) is an input character confirmation information display step ST4 of displaying the acquired input character confirmation information IN1 on the display unit 15.

In Aspect 12, since what the immediately previous input character is can also be easily confirmed, the erroneous input can be reduced.

Aspect 13

As shown in FIGS. 1 and 8, a display program PR0 according to an aspect of the present technique is a display program for displaying, on the display unit 15 including the touch panel 16, the character input area 20 in which the soft keys 21 are arranged, repeatedly receiving, from the character input area 20, the operation for inputting the input character 82, displaying, on the display unit 15, the input character string display area 30 in which the character string 80 that is the sequence of the input character 82 is displayed, and arranging in order, in the input character string display area 30, one of the input character 82 and the replacement character 83 for replacing the input character 82. The display program PR0 causes the computer, for example, the display device 1 to implement an input character confirmation information acquisition function FU3 and an input character confirmation information display function FU4. The input character confirmation information acquisition function FU3 is to acquire, from the database DB1, the input character confirmation information IN1 corresponding to the input character 82 when the operation for inputting the input character 82 is received from the character input area 20. The database DB1 includes the input character confirmation information IN1 for confirming the character 90. The input character confirmation information display function FU4 is to display the acquired input character confirmation information IN1 on the display unit 15.

In Aspect 13, since what the immediately previous input character is can also be easily confirmed, the erroneous input can be reduced.

Further, the present technique can be applied to a multifunction device including the above display device, a display method for the multifunction device, a control program for the multifunction device, a computer-readable medium in which the control program or the display program is recorded, and the like. Any one of the devices may include a plurality of distributed portions.

2. Specific Example of Configuration of System Including Display Device

FIG. 1 schematically shows a configuration of a system SY1 including the display device 1.

The system SY1 shown in FIG. 1 includes a wireless router 100, the display device 1, a printer 200, and the server 300. The display device 1 and the printer 200 are wirelessly coupled to the wireless router 100. The wireless router 100 is coupled to the server 300 via a network NE1. As the network NE1, the Internet, a LAN, a combination thereof, or the like can be applied. Here, the LAN is an abbreviation of local area network.

The display device 1 is a computer including the control unit 10, a storage unit 14, the display unit 15 including the touch panel 16, a communication unit 17, an audio output unit 18, an audio input unit 19, and the like. The control unit 10 includes a CPU 11 that is a processor, a ROM 12 that is a semiconductor memory, a RAM 13 that is a semiconductor memory, and the like. Here, the CPU is an abbreviation of central processing unit. The ROM is an abbreviation of read only memory. The RAM is an abbreviation of random access memory. The plurality of elements indicated by the reference numerals 11 to 19 can input and output information by being electrically coupled.

The storage unit 14 stores an OS and the display program PR0, and may store the database DB1 including the input character confirmation information IN1 shown in FIG. 3. Here, the OS is an abbreviation of operating system. As the storage unit 14, a nonvolatile semiconductor memory such as a flash memory, a magnetic storage device such as a hard disk, or the like can be used.

The display program PR0 is an application program that causes the display device 1 to implement a plurality of functions shown in FIG. 8, for example, an input character string display function FU1, an immediately previous input character display function FU2, the input character confirmation information acquisition function FU3, and the input character confirmation information display function FU4. The plurality of functions indicated by the reference numerals FU1 to FU4 in FIG. 8 are exhibited by installing the display program PR0 in the display device 1, reading the display program PR0 into the RAM 13, and executing the display program PR0 by the CPU 11. As a result, a plurality of steps as shown in FIG. 8, for example, an input character string display step ST1 corresponding to the input character string display function FU1, an immediately previous input character display step ST2 corresponding to the immediately previous input character display function FU2, the input character confirmation information acquisition step ST3 corresponding to the input character confirmation information acquisition function FU3, and the input character confirmation information display step ST4 corresponding to the input character confirmation information display function FU4 are executed.

As the display unit 15, a liquid crystal display panel or the like can be used. The touch panel 16 is attached to a surface of the display unit 15 and receives a touch operation executed by the user. As the touch panel 16, a capacitive touch panel that senses a change in capacitance of the surface due to touch, or the like can be used. The touch panel 16 may be a multi-touch type touch panel capable of detecting touch at a plurality of portions at the same time, or may be a single-touch type touch panel capable of detecting touch at only one portion.

The communication unit 17 is an interface that wirelessly communicates with a communication unit 106 of the wireless router 100 according to a wireless LAN standard such as Wi-Fi (registered trademark). The communication unit 17 can transmit print data to the printer 200 or receive a status from the printer 200 via the wireless router 100. The audio output unit 18 generates audio according to an audio signal. As the audio output unit 18, a general-purpose speaker can be used. The audio input unit 19 converts input audio into an audio signal. As the audio input unit 19, a general-purpose microphone can be used. When the display device 1 is a mobile phone such as a smartphone, during a phone call, the audio output unit 18 generates audio according to an audio signal from a telephone line, and the audio input unit 19 converts audio from a user or the like into an audio signal to be output to the telephone line.

The display device 1 to which the present technique can be applied includes a smart device such as a smartphone or a tablet terminal, a personal computer including a display, a printer including a display panel, an ATM, that is, an automatic teller machine, and the like. It is assumed that the display device 1 in the specific example is a smart device in which the display unit 15 is relatively small.

The wireless router 100 includes a controller 101, a communication I/F 105, the communication unit 106, and the like, and functions as an access point. Here, I/F is an abbreviation of interface. The controller 101 includes a CPU 102, a ROM 103, a RAM 104, and the like, and stores the SSID that is a unique identification name, the password, and the like. The communication I/F 105 is an interface that communicates with the server 300 via the network NE1. The communication unit 106 is an interface that wirelessly communicates with the communication unit 17 of the display device 1 and a communication unit 206 of the printer 200 according to the wireless LAN standard such as the Wi-Fi (registered trademark). The communication unit 106 confirms the SSID and the password from the communication units 17 and 206, and then wirelessly communicates with the communication units 17 and 206.

The printer 200 includes a CPU 201, a ROM 202, a RAM 203, a storage device 204, a printing unit 205, the communication unit 206, and the like. As the storage device 204, a nonvolatile semiconductor memory, a magnetic storage device, or the like can be used. The printing unit 205 executes printing based on the print data received from the display device 1 via the wireless router 100. As the printing unit 205, an inkjet type print engine that ejects an ink droplet onto a print medium, an electrophotographic print engine that attaches toner to the print medium, or the like can be used. The communication unit 206 is an interface that wirelessly communicates with the communication unit 106 of the wireless router 100 according to the wireless LAN standard such as the Wi-Fi (registered trademark). The communication unit 206 can transmit the print data from the display device 1 or transmit the status to the display device 1 via the wireless router 100.

The printer 200 may be a copier, a facsimile machine, a multifunction peripheral having a document reading function and a document printing function, or the like.

The server 300 is a computer including a CPU 301, a ROM 302, a RAM 303, a storage device 304, a communication I/F 305, and the like. The storage device 304 may store the database DB1 including the input character confirmation information IN1 shown in FIG. 3. The communication I/F 305 is an interface that communicates with the wireless router 100 via the network NE1.

In order to cause the printer 200 to execute the printing by operating the display device 1 in the system SY1 described above, first, it is necessary to wirelessly connect the display device 1 to the wireless router 100 by setting the SSID and the password in the display device 1. Regarding the SSID, the display device 1 may automatically acquire the SSID based on an SSID acquisition function that is implemented by the OS on the display device 1, but it is necessary to input at least the password to the display device 1 by the user. When the password or the like is not accurately input to the display device 1, the wireless connection of the display device 1 to the wireless router 100 ends in failure.

FIG. 2 schematically shows a password input screen displayed on the display unit 15 of the display device 1. When the control unit 10 of the display device 1 receives, by the touch panel 16, an operation for wirelessly connecting the display device 1 to the wireless router 100, the control unit 10 displays the password input screen shown in FIG. 2 on the display unit 15. The password input screen includes the character input area 20, the input character string display area 30, the immediately previous input character display area 40, a keyboard switching button 71, an OK button 72, and a cancel button 73.

In the character input area 20, the plurality of soft keys 21 that are used to receive a tap operation are arranged in an orderly manner. The arrangement of the soft keys 21 is a kind of software keyboard. Here, functions of the OS include a function of displaying, on the display unit 15, a software keyboard having a QWERTY layout that is a de facto standard of a key layout. However, since the software keyboard having the QWERTY layout is displayed on the relatively small display unit 15, it is necessary to operate a small soft key, and it is also difficult to execute blind touch on the OS standard software keyboard like a physical keyboard. For this reason, the user often pays close attention to the software keyboard and does not notice the erroneous input of the character. Therefore, in this specific example, the control unit 10 displays, in the character input area 20, the plurality of soft keys 21 in which numbers, lowercase characters of the alphabet, uppercase characters of the alphabet, symbols, and the like are classified and ordered.

The plurality of soft keys 21 shown in FIG. 2 include a plurality of number keys 21a, a plurality of lowercase character keys 21b, a plurality of uppercase character keys 21c, a plurality of symbol keys 21d, a backspace key 21e, and an enter key 21f. These soft keys 21 are color-coded according to types. Character keys to be operated to input the input character 82 include the plurality of number keys 21a, the plurality of lowercase character keys 21b, the plurality of uppercase character keys 21c, and the plurality of symbol keys 21d. Ten kinds of numbers from 1 to 0 are arranged in order on the plurality of number keys 21a. 26 kinds of lowercase characters are arranged in alphabetical order on the plurality of lowercase character keys 21b. 26 kinds of uppercase characters are arranged in alphabetical order on the plurality of uppercase character keys 21c. Therefore, the user can easily search for numbers, lowercase characters of the alphabet, and uppercase character keys of the alphabet, and can easily operate the number keys 21a, the lowercase character keys 21b, and the uppercase character keys 21c. When receiving an operation on any one of the number keys 21a, the lowercase character keys 21b, the uppercase character keys 21c, and the symbol keys 21d by the touch panel 16, the control unit 10 adds the input character 82 to a tail of the character string 80 in the input character string display area 30. When receiving an operation on the backspace key 21e, the control unit 10 deletes a character at the tail of the character string 80. The enter key 21f is a soft key that is used to confirm the character string 80 displayed in the input character string display area 30.

The control unit 10 repeatedly receives, from the character input area 20, the tap operation for inputting the input character 82.

The character string 80 that is the sequence of the input characters 82 is displayed in the input character string display area 30. Every time receiving, from the character input area 20, the operation for inputting the input character 82, the control unit 10 arranges the input character 82 in the input character string display area 30 in order from a left end. For example, when receiving an operation for inputting "A", the control unit 10 adds the "A" that is the immediately previous input character 84 to a right end that is the tail of the character string 80 in the input character string display area 30. The display character 81 in the input character string display area 30 shown in FIG. 2 is the input character 82 itself.

However, the input characters 82 are arranged in the input character string display area 30 displayed on the relatively small display unit 15, and thus each of the input characters 82 is small. Therefore, the user often does not notice the erroneous input of the character. Therefore, in this specific example, the control unit 10 displays, on the display unit 15, the input character confirmation information IN1 for confirming the immediately previous input character 84, and the immediately previous input character display area 40 in which the immediately previous input character 84 is separately displayed.

In the immediately previous input character display area 40, the input character input in response to the immediately previous reception of the operation, that is, the immediately previous input character 84 is displayed in an enlarged manner, and the input character confirmation information IN1 for confirming the immediately previous input character 84 is displayed in the parentheses. The control unit 10 displays the immediately previous input character 84 in the immediately previous input character display area 40 in a manner of being larger than the display character 81 in the input character string display area 30, and larger than a character in the character input area 20. The control unit 10 displays the input character confirmation information IN1 in the immediately previous input character display area 40 with the same character size as that of the immediately previous input character 84. Since the immediately previous input character 84 and the input character confirmation information IN1 are displayed in the immediately previous input character display area 40 that is different from the input character string display area 30, the immediately previous input character 84 and the input character confirmation information IN1 are easily understood, and the user can easily confirm the immediately previous input character. Since the immediately previous input character 84 and the input character confirmation information IN1 are displayed in the large size, the immediately previous input character 84 and the input character confirmation information IN1 are easily understood, and the user can more easily confirm the immediately previous input character. Although details will be described later, the input character confirmation information IN1 for confirming the immediately previous input character 84 is acquired from the database DB1, and is displayed adjacent to the immediately previous input character 84 in the immediately previous input character display area 40.

When receiving an operation on the keyboard switching button 71, the control unit 10 displays the software keyboard having the QWERTY layout on the display unit 15. When receiving an operation on the OK button 72, the control unit 10 determines the character string 80 displayed in the input character string display area 30, and transmits the character string 80 to a next process. When receiving an operation on the cancel button 73, the control unit 10 discards the character string 80 displayed in the input character string display area 30 and returns to a process before password input.

FIG. 3 schematically shows a configuration of the input character confirmation information IN1 included in the database DB1 that is stored in the server 300 or the display device 1.

The input character confirmation information IN1 is information for confirming the character 90. The input character confirmation information IN1 shown in FIG. 3 is divided into a plurality of groups of confirmation information IN2. The plurality of groups of confirmation information IN2 includes confirmation information IN2a with emphasis on the phonetic code, confirmation information IN2b with emphasis on an easy-to-understand word, and confirmation information IN2c with emphasis on the pronunciation. Each confirmation information IN2 includes information associated with the character 90.

Regarding the phonetic code, the word having the character 90 as the initial character regarding the alphabet is adopted, and the phonetic code is used uniformly in many industries. In the confirmation information IN2a with emphasis on the phonetic code, for example, a phonetic code "ALPHA" is associated with an uppercase character "A", and a phonetic code "BRAVO" is associated with an uppercase character "B". The phonetic code such as "alpha" is associated, in a lowercase character form, with the lowercase character. Regarding the number, a word indicating the pronunciation of the character 90 such as "One" is associated with the number.

However, the phonetic code may be a word that is not familiar to the user. Therefore, the input character confirmation information IN1 includes the confirmation information IN2b including the easy-to-understand word which has the character 90 as the initial character of the alphabet. In the confirmation information IN2b, for example, the well-known "APPLE" is associated with a character "A", and the well-known "BANANA" is associated with a character "B". The easy-to-understand word such as "apple" is associated, in a lowercase character form, with the lowercase character. Regarding the symbol, the easy-to-understand word is also associated with the symbol, for example, "Underline" instead of "Underscore" is associated with "_". Regarding the number, since it is easy to understand the number even by the phonetic code, the same word as the phonetic code is associated with the number.

In the confirmation information IN2c with emphasis on the pronunciation, regarding the alphabet, a phonetic symbol of the character 90 such as "ei" is associated with the character 90. The phonetic symbol is an example of the pronunciation. Here, a phonetic symbol whose typeface is larger than that of a phonetic symbol associated with the lowercase character is associated with the uppercase character. Regarding the number, since the pronunciation is also indicated by the phonetic code, the same word as the phonetic code is associated with the number.

As described above, the input character confirmation information IN1 includes the phonetic code of the character 90 such as "ALPHA", the word having the character 90 as the initial character such as "APPLE", and the pronunciation of the character 90 such as "ei" or "One".

FIG. 4 schematically shows a configuration of the database DB1 including the input character confirmation information IN1 described above. As shown in FIG. 4, the input character confirmation information IN1 is divided into a plurality of groups of country-specific or region-specific information IN3 according to countries or regions, and is divided into a plurality of groups of language-specific information IN4 according to languages.

The plurality of groups of country-specific or region-specific information IN3 shown in FIG. 4 includes country A confirmation information IN3a, country B confirmation information IN3b, country C confirmation information IN3c, region D confirmation information IN3d, and the like. The plurality of groups of language-specific information IN4 shown in FIG. 4 includes language a confirmation information IN4a, language b confirmation information IN4b, language e confirmation information IN4c, language c confirmation information IN4d, and the like. In FIG. 4, a relation between the plurality of groups of country-specific or region-specific information IN3 and the plurality of groups of language-specific information IN4 is indicated by a two-dot chain line arrow.

For example, when one type of language is used in the country A and the region D, the language-specific information IN4 corresponding to the used language can be used as the country-specific or region-specific information IN3. In the example shown in FIG. 4, the language a confirmation information IN4a is used in the country A confirmation information IN3a, and the language c confirmation information IN4d is used in the region D confirmation information IN3d. The country B confirmation information IN3b for country B where languages a, b, and e are used includes the language a confirmation information IN4a, language b confirmation information IN4b, and language e confirmation information IN4c. Therefore, it can be said that the country B confirmation information IN3b is divided into the language a confirmation information IN4a, the language b confirmation information IN4b, and the language e confirmation information IN4c.

Hereinafter, a process example of setting a group for displaying the input character confirmation information IN1 according to language setting of the display device 1 will be described with reference to FIG. 5 and the like.

3. Specific Example of Process Executed by Display Device

FIG. 5 shows a group setting process executed by the control unit 10 of the display device 1. This process includes processes of steps S102 to S108. Hereinafter, the description of "step" is omitted, and reference numerals of the steps are shown in parentheses. The group setting process is executed, for example, when the display program PR0 is installed in the display device 1.

When the group setting process is started, the control unit 10 acquires the language setting indicating a language set in the display device 1 (S102). The OS of the display device 1 causes the display device 1 to implement a function of receiving the language setting and storing the language setting in the storage unit 14, and a function of reading the language setting from the storage unit 14 in response to a language setting acquisition request from an application program and transmitting the language setting to the application program. Therefore, the control unit 10 can execute a process of acquiring the language setting from the OS by issuing the language setting acquisition request to the OS. After acquiring the language setting, the control unit 10 executes a process of setting the language-specific information IN4 corresponding to the acquired language setting as the input character confirmation information IN1 to be used, for example, a process of storing, in the storage unit 14, setting information indicating the language-specific information IN4 corresponding to the language setting (S104).

The input character confirmation information IN1, which is the language-specific information IN4 corresponding to the language setting, may be divided into a plurality of groups of confirmation information IN2 as shown in FIG. 3. When the input character confirmation information IN1 is divided into groups, the control unit 10 displays the confirmation information selection area 60 as shown in FIG. 6 on the display unit 15 (S106).

FIG. 6 schematically shows the confirmation information selection area 60 displayed on the display unit 15 based on the input character confirmation information IN1 shown in FIG. 3. The confirmation information selection area 60 is an area for receiving selection of confirmation information to be displayed on the display unit 15 from the plurality of groups of confirmation information IN2. The confirmation information selection area 60 shown in FIG. 6 includes selection areas 60a, 60b, and 60c for selecting the confirmation information IN2, an editing button 60e, a setting end button 60f, and a cancel button 60g. The selection area 60a is an area for selecting the confirmation information IN2a with emphasis on the phonetic code. The selection area 60b is an area for selecting the confirmation information IN2b with emphasis on the easy-to-understand word. The selection area 60c is an area for selecting the confirmation information IN2c with emphasis on the pronunciation. FIG. 6 shows that a radio button of the selection area 60b is turned on by executing an operation of selecting the selection area 60b corresponding to the confirmation information IN2b with emphasis on the easy-to-understand word. When receiving an operation on the setting end button 60f, the control unit 10 stores, in the storage unit 14, group setting indicating confirmation information corresponding to an area selected from the selection areas 60a, 60b, and 60c (S108 of FIG. 5), and ends the group setting process. When receiving an operation on the cancel button 60g, the control unit 10 stores default group setting in the storage unit 14 and ends the group setting process.

Depending on the user, it may be desired to customize a part of the input character confirmation information IN1 while following the group setting as a whole. Therefore, the editing button 60e for editing a part of the input character confirmation information IN1 is provided in the confirmation information selection area 60 shown in FIG. 6. When receiving an operation on the editing button 60e, the control unit 10 displays the editing area 50 on the display unit 15 as shown in FIG. 7.

FIG. 7 schematically shows the editing area 50 displayed on the display unit 15. The editing area 50 is an area for receiving the editing of the input character confirmation information IN1 to be displayed on the display unit 15. The editing area 50 shown in FIG. 7 includes an editing field 50a, an editing end button 50b, and a cancel button 50c. In the editing field 50a, a list of the input character confirmation information IN1 associated with the character 90 is shown. The input character confirmation information IN1 in the editing field 50a shown in FIG. 7 is one group of confirmation information selected from the plurality of groups of confirmation information IN2. The control unit 10 receives, by the touch panel 16, an operation for editing the input character confirmation information IN1 in the editing field 50a. For example, when the user executes, using a software keyboard (not shown), an operation for changing the input character confirmation information "BANANA" associated with the uppercase character "B" to "BONUS", the control unit 10 associates the input character confirmation information "BONUS" with the uppercase character "B". At this time, the control unit 10 may change "banana" associated with the lowercase character "b" that is the same alphabet as the uppercase character "B" to "bonus". When receiving an operation on the editing end button 50b, the control unit 10 stores the edited input character confirmation information IN1 in, for example, the database DB1, and deletes the editing area 50 from the display unit 15. An edited content may be stored in the storage unit 14 separately from the database DB1. When receiving an operation on the cancel button 50c, the control unit 10 discards the edited content and deletes the editing area 50 from the display unit 15.

FIG. 8 shows a character string input reception process executed by the control unit 10. Here, S206 corresponds to the input character string display step ST1 and the input character string display function FU1. S208 corresponds to the immediately previous input character display step ST2 and the immediately previous input character display function FU2. S210 corresponds to the input character confirmation information acquisition step ST3 and the input character confirmation information acquisition function FU3. S212 corresponds to the input character confirmation information display step ST4 and the input character confirmation information display function FU4. The character string input reception process is executed, for example, when the operation for wirelessly connecting the display device 1 to the wireless router 100 is received by the touch panel 16.

When the character string input reception process is started, the control unit 10 displays an initial screen on the display unit 15 (S202). Although not shown, the initial screen is a screen in a state in which no input character 82 is displayed in the input character string display area 30 and the immediately previous input character display area 40 on the password input screen shown in FIG. 2.

After the control unit 10 displays the initial screen, the process branches according to the operation on the character input area 20 or the like (S204).

When the character keys indicated by the reference numerals 21a, 21b, 21c, and 21d are operated, the control unit 10 arranges the input characters 82 corresponding to the operated character keys in order in the input character string display area 30 (S206). Then, as in the input character string display area 30 shown in FIG. 2, the character string 80 that is the sequence of the input characters 82 is displayed in the input character string display area 30.

Here, as shown in FIG. 9A, the replacement character 83 for replacing the input character 82 may be arranged in order in the input character string display area 30. FIG. 9A schematically shows another example of the input character string display area 30.

In the input character string display area 30, the control unit 10 arranges "*" that is the replacement character 83 for replacing the input character 82, except for the immediately previous input character 84. Since the replacement character 83 only hides the input character 82, the character string 80 shown in the input character string display area 30 can be said to be the sequence of the input character 82. The display characters 81 in the input character string display area 30 shown in FIG. 9A are the replacement characters 83 for replacing the input characters 82, except for the immediately previous input character 84. In order to confirm the input characters 82 that are replaced into the replacement characters 83, the control unit 10 may display a password display button 74 on the display unit 15, and may display all the input characters 82 included in the character string 80 in the input character string display area 30 when receiving an operation on the password display button 74.

As shown in FIG. 9B, the character string 80 may be the SSID. The SSID is an example of the identifier. FIG. 9B schematically shows an SSID input screen displayed on the display unit 15. The control unit 10 repeatedly receives, from the character input area 20, the operation for inputting the input character 82, and displays the SSID that is the character string 80 in the input character string display area 30. The example shown in FIG. 9B is suitable when the SSID acquisition function of the OS does not work.

After the process of S206 shown in FIG. 8, the control unit 10 displays the immediately previous input character 84 in the immediately previous input character display area 40 in a manner of being larger than the display character 81 in the input character string display area 30 (S208). The immediately previous input character 84 in the immediately previous input character display area 40 is larger than the character in the character input area 20.

Here, as shown in FIGS. 2 and 9B, the control unit 10 may change the typeface depending on whether the immediately previous input character 84 displayed in the immediately previous input character display area 40 is the uppercase character of the alphabet or the lowercase character of the alphabet. Accordingly, the user can easily determine whether the immediately previous input character 84 is the uppercase character of the alphabet or the lowercase character of the alphabet.

Further, as shown in FIG. 9C, the control unit 10 may change the character size depending on whether the immediately previous input character 84 displayed in the immediately previous input character display area 40 is the uppercase character of the alphabet or the lowercase character of the alphabet. FIG. 9C schematically shows display of the uppercase character of the alphabet and display of the lowercase character of the alphabet in the immediately previous input character display area 40. It is shown that in the immediately previous input character display area 40 shown in FIG. 9C, the immediately previous input character 84 is displayed with a relatively small character size when the immediately previous input character 84 is the lowercase character of the alphabet, and the immediately previous input character 84 is displayed with a relatively large character size when the immediately previous input character 84 is the uppercase character of the alphabet. As shown in FIG. 9C, the typeface of the immediately previous input character 84 when the immediately previous input character 84 is the uppercase character of the alphabet is different from that when the immediately previous input character 84 is the lowercase character of the alphabet. However, the typeface of the immediately previous input character 84 when the immediately previous input character 84 is the uppercase character of the alphabet may be the same as that when the immediately previous input character 84 is the lowercase character of the alphabet.

Further, as shown in FIG. 10, the control unit 10 may display, on the display unit 15, the animation display 25 in which the input character 82 input in response to the reception of the operation floats from the character input area 20 and moves to the immediately previous input character display area 40. FIG. 10 schematically shows the animation display 25 of the input character 82. The input character 82 may move continuously or may move in a stepwise manner toward the immediately previous input character display area 40 after floating from the character input area 20. When the animation display 25 in which the input character 82 floats from the character input area 20 and moves to the immediately previous input character display area 40 is executed, it is easier to confirm the immediately previous input character.

After S208 shown in FIG. 8, the control unit 10 acquires the input character confirmation information IN1 corresponding to the input character 82 from the database DB1 including the input character confirmation information IN1 (S210). When the database DB1 is stored in the storage unit 14, the control unit 10 can acquire the input character confirmation information IN1 corresponding to the input character 82 from the database DB1 stored in the storage unit 14. When the database DB1 is stored in the server 300, the control unit 10 transmits an acquisition request for the input character confirmation information IN1 corresponding to the input character 82 to the server 300. When receiving the acquisition request, the server 300 reads the input character confirmation information IN1 corresponding to the input character 82 from the database DB1, and transmits the input character confirmation information IN1 to the display device 1. The display device 1 can acquire the input character confirmation information IN1 corresponding to the input character 82 by receiving the input character confirmation information IN1 from the server 300.

Here, as shown in FIG. 4, when the input character confirmation information IN1 is divided into the plurality of groups of language-specific information IN4, the control unit 10 acquires, from the database DB1, the language-specific information IN4 corresponding to the language setting of the display device 1 among the input character confirmation information IN1 corresponding to the input character 82, according to the setting information stored in the storage unit 14. When the input character confirmation information IN1, which is the language-specific information IN4 corresponding to the language setting, is divided into a plurality of groups of confirmation information IN2, the control unit 10 acquires, from the database DB1, the confirmation information IN2 selected among the input character confirmation information IN1 corresponding to the input character 82, according to the group setting stored in the storage unit 14. When the edited input character confirmation information IN1 is stored in the database DB1, the control unit 10 acquires the edited input character confirmation information IN1 corresponding to the input character 82 from the database DB1. When the edited input character confirmation information IN1 is stored in the storage unit 14 separately from the database DB1, the control unit 10 acquires the edited input character confirmation information IN1 from the storage unit 14 when the input character confirmation information IN1 corresponding to the input character 82 is edited.

For example, it is assumed that the language setting of the display device 1 is English, and the selection area 60*b* of "emphasis on easy-to-understand word" is selected from the confirmation information selection area 60 shown in FIG. 6. In this case, the control unit 10 acquires confirmation information corresponding to the input character 82 from the confirmation information IN2*b* with emphasis on the easy-to-understand word among the input character confirmation information IN1 shown in FIG. 3. As shown in FIG. 2, when the immediately previous input character 84 is "A", the control unit 10 acquires "APPLE" that is the confirmation information IN2*b* with emphasis on the easy-to-understand word among the input character confirmation information IN1 corresponding to the input character "A". As shown in FIG. 9B, when the immediately previous input character 84 is "a", the control unit 10 acquires "apple" that is the confirmation information IN2*b* with emphasis on the easy-to-understand word among the input character confirmation information IN1 corresponding to the input character "a".

After S210 shown in FIG. 8, the control unit 10 displays the input character confirmation information IN1 acquired from the database DB1 following the immediately previous input character 84 in the immediately previous input character display area 40 (S212), and returns the process to S204. As shown in FIGS. 2 and 9B, the input character confirmation information IN1 displayed in the immediately previous input character display area 40 has the same character size as the immediately previous input character 84 displayed in the immediately previous input character display area 40. Since the input character confirmation information IN1 is displayed in the large size, the user can easily confirm the immediately previous input character. In addition, the control unit 10 displays the input character confirmation information IN1, corresponding to the immediately previous input character 84, in parentheses in the immediately previous input character display area 40. Since the user can view the input character confirmation information IN1 displayed in the parentheses according to the input character input in response to the immediately previous operation, the user can more easily confirm the immediately previous input character.

Here, as shown in FIG. 9C and the like, the control unit 10 may display the input character confirmation information IN1 in the immediately previous input character display area 40 such that at least one of the typeface and the character size is changed depending on whether the input character 82 is the uppercase character of the alphabet or the lowercase character of the alphabet. When the input character confirmation information IN1 is displayed such that at least one of the typeface and the character size when the input character 82 is the uppercase character of the alphabet is different from that when the input character 82 is the lowercase character of the alphabet, the immediately previous input character can be more easily confirmed.

As shown in FIG. 4, when the input character confirmation information IN1 is divided into a plurality of groups of language-specific information IN4, the language-specific information IN4 corresponding to the language setting of the display device 1 among the input character confirmation information IN1 corresponding to the input character 82 is displayed in the immediately previous input character display area 40. Therefore, the user can more easily confirm the immediately previous input character.

When the input character confirmation information IN1, which is the language-specific information IN4 corresponding to the language setting, is divided into a plurality of groups of confirmation information IN2, the confirmation information IN2 corresponding to the group setting among the input character confirmation information IN1 corresponding to the input character 82 is displayed in the immediately previous input character display area 40. Therefore, the user can more easily confirm the immediately previous input character.

For example, when the language setting of the display device 1 is English and the selection region 60*b* of the "emphasis on easy-to-understand word" is selected from the confirmation information selection area 60 shown in FIG. 6, the confirmation information IN2*b* with emphasis on the easy-to-understand word among the input character confirmation information IN1 shown in FIG. 3 is displayed in the immediately previous input character display area 40. As shown in FIG. 2, when the immediately previous input character 84 is "A", the confirmation information "APPLE" corresponding to the input character "A" among the confirmation information IN2*b* with emphasis on the easy-to-understand word is displayed in the immediately previous input character display area 40. As shown in FIG. 9B, when the immediately previous input character 84 is "a", the confirmation information "apple" corresponding to the input character "a" among the confirmation information IN2*b* with emphasis on the easy-to-understand word is displayed in the immediately previous input character display area 40.

When receiving the editing of the input character confirmation information IN1 corresponding to the input character 82, the control unit 10 displays the input character confirmation information IN1, which corresponds to the input character 82 and is obtained in response to reception of the editing, in the immediately previous input character display area 40. Since the customized input character confirmation information IN1 is displayed, the user can more easily confirm the immediately previous input character.

By repeating the processes of S204 to S212 shown in FIG. 8, the control unit 10 repeatedly receives, from the character input area 20, the operation for inputting the input character 82, arranges the input character 82 or the replacement character 83 in order in the input character string display area 30, and displays the immediately previous input character 84 and the input character confirmation information IN1 corresponding to the immediately previous input character 84 in the immediately previous input character display area 40.

In a determination process of S204 shown in FIG. 8, when the backspace key 21*e* shown in FIG. 2 is operated, the control unit 10 deletes the character at the tail of the character string 80 displayed in the input character string display area 30, and returns the process to S204. In the determination process of S204 shown in FIG. 8, when the keyboard switching button 71 shown in FIG. 2 is operated, the character input area 20 shown in FIG. 2 and the software keyboard having the QWERTY layout are switched, and the process returns to S204. In the determination process of S204 shown in FIG. 8, when the cancel button 73 shown in FIG. 2 is operated, the control unit 10 discards the character string 80 displayed in the input character string display area 30 and ends the character string input reception process.

When the enter key 21*f* or the OK button 72 is operated in the determination process of S204 shown in FIG. 8, the control unit 10 determines the character string 80 displayed in the input character string display area 30, transmits the character string 80 to the next process (S214), and ends the character string input reception process.

As described above, when the user operates the character input area 20, the input character 82 or the replacement character 83 is arranged in order in the input character string display area 30, and the input character confirmation information IN1 corresponding to the input character 82 is displayed in the immediately previous input character display area 40. The user can confirm whether the input character 82 is correct by viewing the input character confirmation information IN1 corresponding to the input character 82. As described above, in this specific example, since what the immediately previous input character is can be easily confirmed, the erroneous input of important registration information such as the password, the identifier, and the like can be reduced, failure of setting such as wireless connection can be reduced.

4. Modifications

Various modifications of the present disclosure are conceivable.

For example, when the replacement character 83 is arranged in the input character string display area 30 as shown in FIG. 9A, the immediately previous input character 84 may be replaced with the replacement character 83.

The control unit 10 may receive setting as to whether to arrange the input character 82 or the replacement character 83 in the input character string display area 30. In addition, the control unit 10 may arrange the input character 82 in the input character string display area 30 when the setting is to arrange the input character 82, and arrange the replacement character 83 in the input character string display area 30 when the setting is to arrange the replacement characters 83.

The above process can be appropriately changed, for example, an order is changed. For example, in the character string input reception process shown in FIG. 8, the process of S206 for arranging the input character 82 in the input character string display area 30 can be executed after any of the processes of S208, S210, and S212.

As shown in FIG. 11, the control unit 10 may set a group for displaying the input character confirmation information IN1 according to the country or the region where the display device 1 is present. FIG. 11 shows another example of the group setting process executed by the control unit 10.

When the group setting process is started, the control unit 10 acquires information of the country or the region where the display device 1 is present (S122). The OS of the display device 1 causes the display device 1 to implement a function of acquiring information of the country or the region where the display device 1 is present and storing the information in the storage unit 14, and a function of reading the information of the country or the region from the storage unit 14 in response to a country or region setting acquisition request from an application program and transmitting the information to the application program. In addition, the OS of the display device 1 may cause the display device 1 to implement a function of receiving setting of the country or the region and storing the setting in the storage unit 14, and a function of reading the setting of the country or the region from the storage unit 14 in response to the country or region setting acquisition request from the application program and transmitting the information of the country or the region to the application program. The control unit 10 can execute a process of acquiring the information of the country or the region from the OS by issuing the country or region setting acquisition request to the OS. After the process of S122, the control unit 10 executes a process of setting, based on the acquired information of the country or the region, the country-specific or region-specific information IN3 corresponding to the country or the region as the input character confirmation information IN1 to be used, for example, a process of storing, in the storage unit 14, setting information indicating the country-specific or region-specific information IN3 corresponding to the country or the region (S124).

The input character confirmation information IN1, which is the country-specific or region-specific information IN3 corresponding to the country or the region, may be divided into a plurality of groups of confirmation information IN2 as shown in FIG. 3. When the input character confirmation information IN1 is divided into groups, the control unit 10 displays the confirmation information selection area 60 as shown in FIG. 6 on the display unit 15 (S126). After the confirmation information selection area 60 is displayed, the control unit 10 stores, in the storage unit 14, group setting indicating confirmation information corresponding to an area selected from the selection areas 60a, 60b, and 60c (S128), and ends the group setting process.

When the group setting process shown in FIG. 11 is executed, in S210 shown in FIG. 8, the control unit 10 acquires, from the database DB1, the confirmation information IN2 selected among the country-specific or region-specific information IN3 corresponding to the input character 82, according to the group setting stored in the storage unit 14. Accordingly, in S212 shown in FIG. 8, the country-specific or region-specific information IN3 corresponding to the country or the region where the display device 1 is present among the input character confirmation information IN1 corresponding to the input character 82 is displayed in the immediately previous input character display area 40. Therefore, the user can more easily confirm the immediately previous input character.

As shown in FIG. 12, the present technique can also be applied when the display unit 15 does not display the immediately previous input character display area 40. FIG. 12 schematically shows another password input screen displayed on the display unit 15 of the display device 1. The password input screen includes the character input area 20, the input character string display area 30, the keyboard switching button 71, the OK button 72, the cancel button 73, and the password display button 74. As shown in FIG. 12, the plurality of soft keys 21 can have various color schemes, such as not being color-coded. On the password input screen shown in FIG. 12, the immediately previous input character display area 40 is not displayed, and the input character confirmation information IN1 is displayed in a balloon according to the immediately previous input character 84 arranged at the tail of the character string 80 displayed in the input character string display area 30. The control unit 10 sequentially arranges the replacement characters 83 in the input character string display area 30 except for the immediately previous input character 84, acquires the input character confirmation information IN1 corresponding to the immediately previous input character 84 from the database DB1, and displays the acquired input character confirmation information IN1 in the balloon described above. In the example, since what the immediately previous input character is can also be easily confirmed, the erroneous input can be reduced.

Although not shown, the input character confirmation information IN1 may include only the phonetic code of the character 90, or may include only the word having the character 90 as the initial character. Of course, the input character confirmation information IN1 may not be divided into a plurality of groups of confirmation information IN2. The confirmation information selection area 60 shown in FIG. 6 may not be displayed on the display unit 15. The group setting process shown in FIGS. 5 and 11 may not be executed.

5. Conclusion

As described above, according to the present disclosure, a technique for reducing the erroneous input can be provided based on various aspects. Of course, the above basic functions and effects can be obtained even with a technique which does not include constituent requirements according to the dependent claims but includes only the constituent requirements according to the independent claims.

In addition, it is also possible to implement a configuration in which configurations disclosed in the above examples are replaced with each other or a combination thereof is changed, a configuration in which configurations disclosed in known techniques and the above examples are replaced with each other or a combination thereof is changed, and the like. The present disclosure also includes these configurations and the like.

What is claimed is:

1. A display device, comprising:
a display unit including a touch panel; and
a control unit configured to:
  display, on the display unit, a character input area in which a soft key is arranged;
  repeatedly receive, from the character input area, an operation for inputting an input character;
  display, on the display unit, an input character string display area in which a character string that is a sequence of the input character is displayed, wherein the character string is one of a password and an identifier;
  arrange in order, in the input character string display area, one of the input character and a replacement character for replacing the input character;
  acquire from a database including input character confirmation information for confirming a character, when receiving the operation for inputting the input character from the character input area, the input character confirmation information corresponding to the input character, wherein
    the input character confirmation information includes at least one of a phonetic code of the character, a word having the character as an initial character, and a pronunciation of the character; and
  display the acquired input character confirmation information on the display unit.

2. The display device according to claim 1, wherein the control unit is configured to display, on the display unit, an immediately previous input character display area, in which an immediately previous input character input in response to immediately previous reception of the operation is displayed, separately from the input character string display area.

3. The display device according to claim 2, wherein the control unit is configured to display the immediately previous input character in the immediately previous input character display area in a manner of being larger than a display character in the input character string display area.

4. The display device according to claim 2, wherein the control unit is configured to display the input character confirmation information in parentheses in the immediately previous input character display area.

5. The display device according to claim 2, wherein the control unit is configured to display, on the display unit, the input character input in response to the reception of the operation, such that the input character floats from the character input area and moves to the immediately previous input character display area.

6. The display device according to claim 1, wherein the control unit is configured to display the input character confirmation information on the display unit such that at least one of a typeface and a character size is changed depending on whether the input character is an uppercase character of an alphabet or is a lowercase character of the alphabet.

7. The display device according to claim 1, wherein the control unit is configured to
  display, on the display unit, an editing area for receiving editing of the input character confirmation information to be displayed on the display unit, and
  display on the display unit, when receiving the editing of the input character confirmation information from the editing area, the input character confirmation information that corresponds to the input character and is obtained in response to the reception of the editing.

8. The display device according to claim 1, wherein the input character confirmation information is divided into a plurality of groups of confirmation information, and
the control unit is configured to
  display, on the display unit, a confirmation information selection area for receiving selection of confirmation information to be displayed on the display unit from the plurality of groups of confirmation information,
  acquire from the database, when receiving the selection of the confirmation information from the confirmation information selection area, the confirmation information selected among the input character confirmation information corresponding to the input character, and
  display the acquired confirmation information on the display unit.

9. The display device according to claim 1, wherein the input character confirmation information is divided into a plurality of groups of country-specific or region-specific information according to countries or regions, and
the control unit is configured to
  acquire, from the database, country-specific or region-specific information corresponding to a country or a region where the display device is present among the input character confirmation information corresponding to the input character, and
  display the acquired country-specific or region-specific information on the display unit.

10. The display device according to claim 1, wherein the input character confirmation information is divided into a plurality of groups of language-specific information according to languages, and
the control unit is configured to
  acquire, from the database, language-specific information corresponding to a language set in the display device among the input character confirmation information corresponding to the input character, and
display the acquired language-specific information on the display unit.

11. A display method for
displaying, on a display unit including a touch panel, a character input area in which a soft key is arranged;
repeatedly receiving, from the character input area, an operation for inputting an input character;
displaying, on the display unit, an input character string display area in which a character string that is a sequence of the input character is displayed, wherein the character string is one of a password and an identifier; and
arranging in order, in the input character string display area, one of the input character and a replacement character for replacing the input character,
the display method comprising:
acquiring from a database including input character confirmation information for confirming a character, when the operation for inputting the input character is received from the character input area, the input character confirmation information corresponding to the input character, wherein
the input character confirmation information includes at least one of a phonetic code of the character, a word having the character as an initial character, and a pronunciation of the character; and
displaying the acquired input character confirmation information on the display unit.

12. A non-transitory computer-readable storage medium storing a display program for
displaying, on a display unit including a touch panel, a character input area in which a soft key is arranged,
repeatedly receiving, from the character input area, an operation for inputting an input character,
displaying, on the display unit, an input character string display area in which a character string that is a sequence of the input character is displayed, wherein the character string is one of a password and an identifier, and
arranging in order, in the input character string display area, one of the input character and a replacement character for replacing the input character,
the display program causing a computer to implement:
an input character confirmation information acquisition function of acquiring from a database including input character confirmation information for confirming a character, when the operation for inputting the input character is received from the character input area, the input character confirmation information corresponding to the input character, wherein
the input character confirmation information includes at least one of a phonetic code of the character, a word having the character as an initial character, and a pronunciation of the character; and
an input character confirmation information display function of displaying the acquired input character confirmation information on the display unit.

* * * * *